Oct. 14, 1947.       J. B. HUNT       2,429,023

BRAKE ADJUSTER

Filed July 16, 1946

Inventor:-
JOHN B. HUNT.
per
Norman S. Barlow
Attorney

Patented Oct. 14, 1947

2,429,023

UNITED STATES PATENT OFFICE 2,429,023

BRAKE ADJUSTER

John Blain Hunt, Penylan, Cardiff, Wales

Application July 16, 1946, Serial No. 683,838½
In Great Britain July 28, 1945

1 Claim. (Cl. 188—79.5)

This invention comprises improvements in brake adjusting mechanism and has for its object to provide a simple and efficient adjuster wherein the drum to lining clearance is automatically maintained at a predetermined amount independently on each brake shoe during the life of the brake lining.

A further object is to provide an automatic adjuster which is not dependent on springs for effecting the adjustment.

Figure 1:
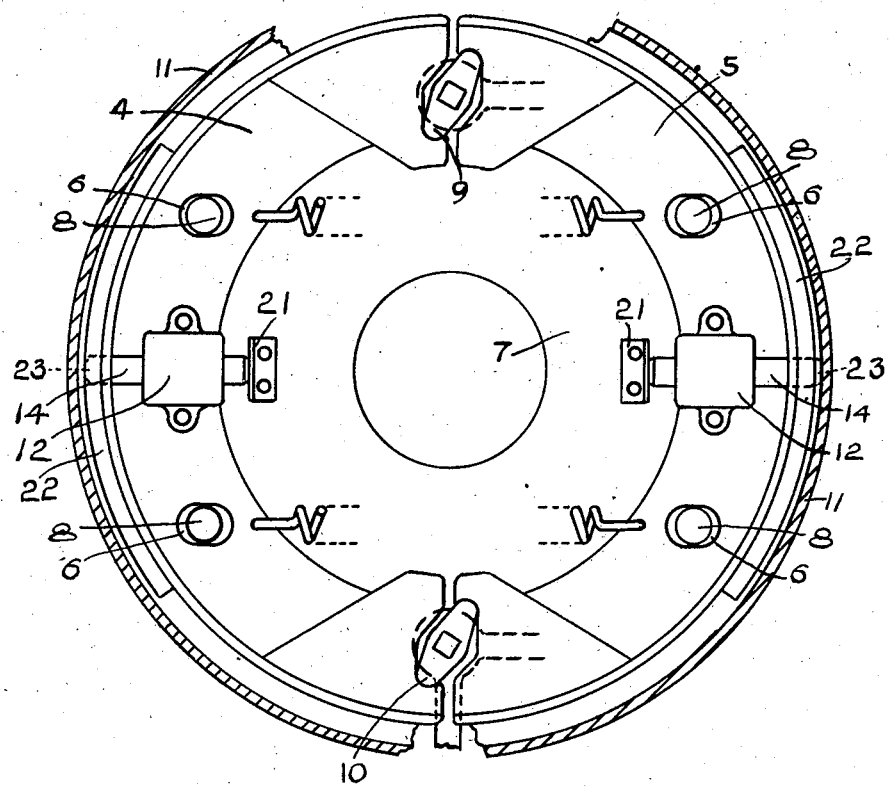
Figure 2:
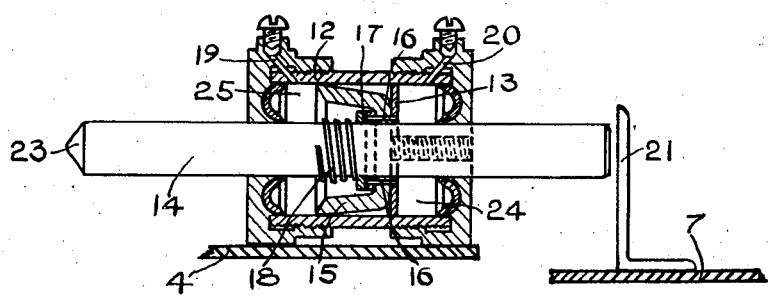

Referring to the accompanying drawings:

Figure 1 is the back plate of a brake on which is mounted the brake shoes, having adjusters according to this invention, and Figure 2 is a vertical section of the adjuster according to this invention.

In carrying the present invention into practice as shown upon the accompanying drawings, the brake shoes 4, 5 have provided therein slots 6. The back plate 7 has mounted therein pillars or studs 8 which are adapted to carry the brake shoes 4, 5 which are adapted to slide in the pillars 8 by virtue of the slots 6 in the brake shoes 4, 5.

The two ends of the brake shoes 4, 5 have rotatably mounted between same, the cams 9, 10 which are rotated simultaneously by any suitable means to force the brake shoes into engagement with the brake drum 11.

Mounted on each of the brake shoes 4, 5 are dash pots 12 in each of which is mounted the piston 13 and piston rod 14.

Positioned on the piston rod 14 and adjacent to the piston 13 is a leather or other suitable washer 15, whilst passages 16 are formed in the piston 13 and washer 15 which are for the purpose of permitting the passage of fluid from one side of the piston 13 to the other side of same.

Closing the passages 16 is a leather or other suitable washer 17 which is normally held over the passages 16 by the compression spring 18, which permits of the passage of the fluid in the dashpot 12 in one direction only, thus forming a non-return valve.

Passages 19, 20 to the dashpot 12 are provided for filling the dashpot 12 or "bleeding" same for adjustment purposes, if desired.

Adjustably mounted on the back plate 7 of the brake, are brackets 21, which are so adjusted, in relation to the end of the piston rod 14, adjacent to said bracket 21, as to set the predetermined clearance between the brake lining 22 and the brake drum 11.

The end 23 of the piston rod 14 is preferably tipped with a material which is slightly harder than the lining 22 and is arranged to project through the brake shoe and lining 22 and so contact the brake drum 11.

When the brake adjuster is initially set, the brake linings 22 are in contact with the brake drum 11, in which case the end 23 of the piston will also be in contact with the brake drum 11. The bracket 21 is then adjusted, so that the distance between the end of the piston 14 and the bracket 21, is the desired clearance, it is required to maintain between the brake drum 11 and the brake lining 22.

On wear taking place on the brake lining 22 the piston rod 14 will be forced inwards the amount of the lining wear, which will compress the fluid in the part 24 of the dashpot 12 and cause it to pass through the passages 16 against the action of the spring controlled washer 17 into the part 25 of the dashpot 12, where it will be unable to return, thereby advancing the dashpot 12, together with the brake shoe along the piston rod 14 the amount of wear on the brake lining 22, which has taken place, but at the same time retaining the predetermined distance between the end of the piston rod 14 and the bracket 21.

It will be seen that the before described automatic adjustment of the brake shoes for lining wear, retains the predetermined lining to drum clearance, until the brake lining is worn down sufficient for replacement, whilst at the same time each lining is adjusted for lining wear independent of the other and furthermore, the brake lining to brake drum clearance remains constant irrespective of the expansion due to heat of the brake drum.

I claim:

A brake adjuster for automatically taking up the wear on a brake lining, comprising in combination a brake shoe and lining, a dashpot mounted on said brake shoe, a piston rod slidably mounted in said dashpot one end of which is adapted to engage the brake drum, an adjustable member which is adapted to engage the piston rod when the brake is in its retracted position whilst in its advanced position the clearance between the end of the piston rod and the adjustable member controls the brake lining to brake drum clearance and a one way valve which is adapted to control the passage of the fluid in the dashpot from one side of the piston to the other on wear taking place on the brake shoe lining.

JOHN BLAIN HUNT.

REFERENCES CITED

The following references are of record in the file of this patent:

UNITED STATES PATENTS

| Number | Name | Date |
|---|---|---|
| 2,168,646 | Goepfrich | Aug. 8, 1939 |
| 2,222,858 | Ryan | Nov. 26, 1940 |